Aug. 8, 1961  R. F. POSIVIO  2,995,400
LATCH FOR A VEHICLE UNLOADING DOOR
Filed Aug. 22, 1960  3 Sheets-Sheet 1
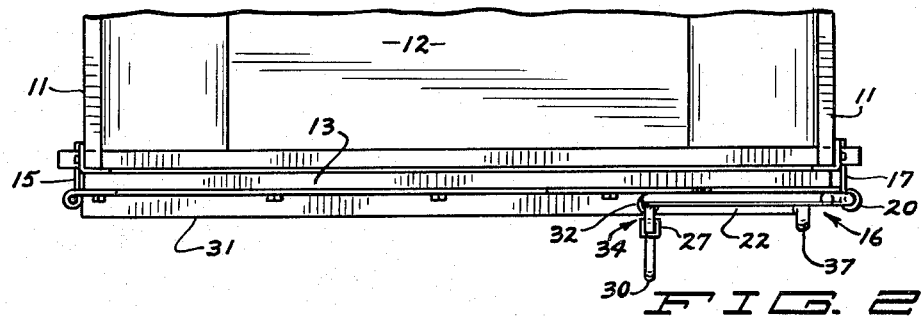
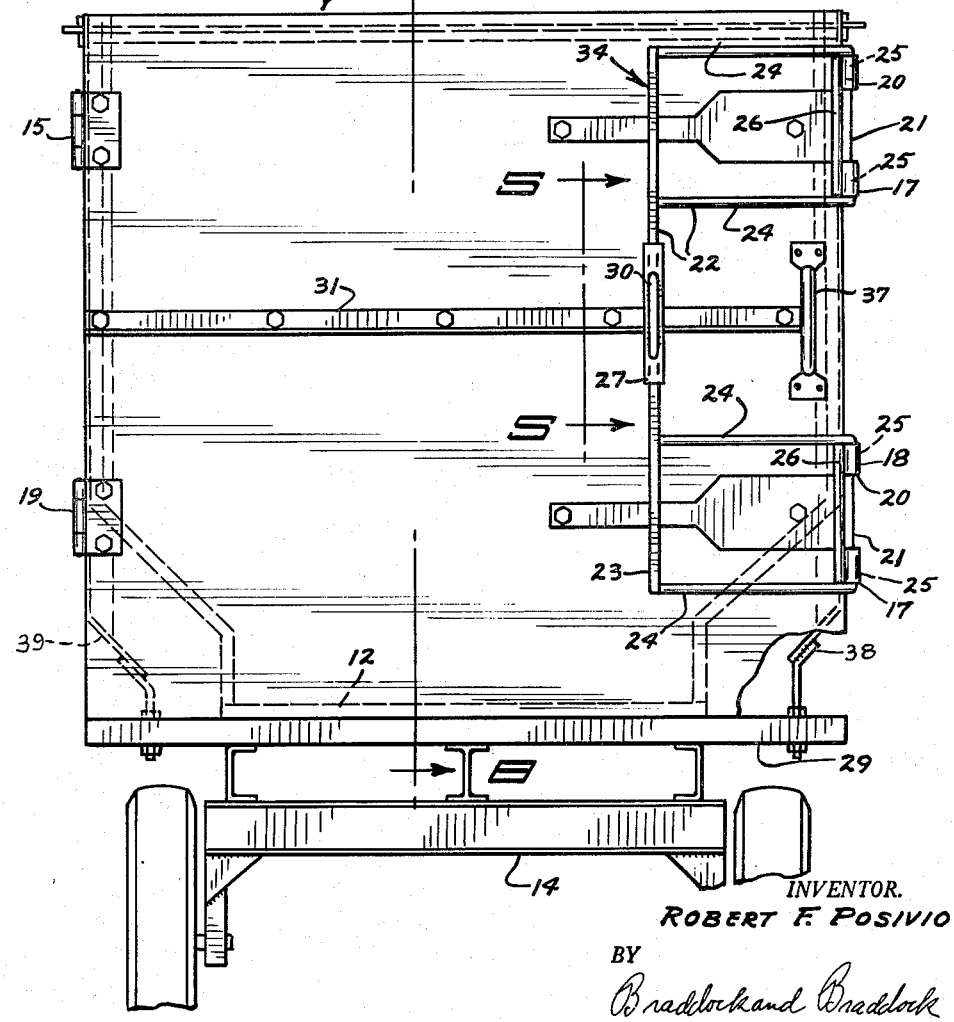
INVENTOR.
ROBERT F. POSIVIO
BY
Braddock and Braddock
ATTORNEYS

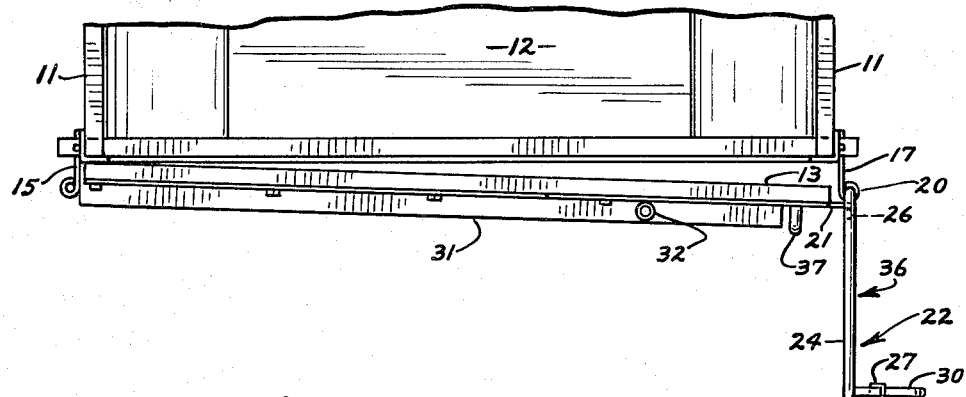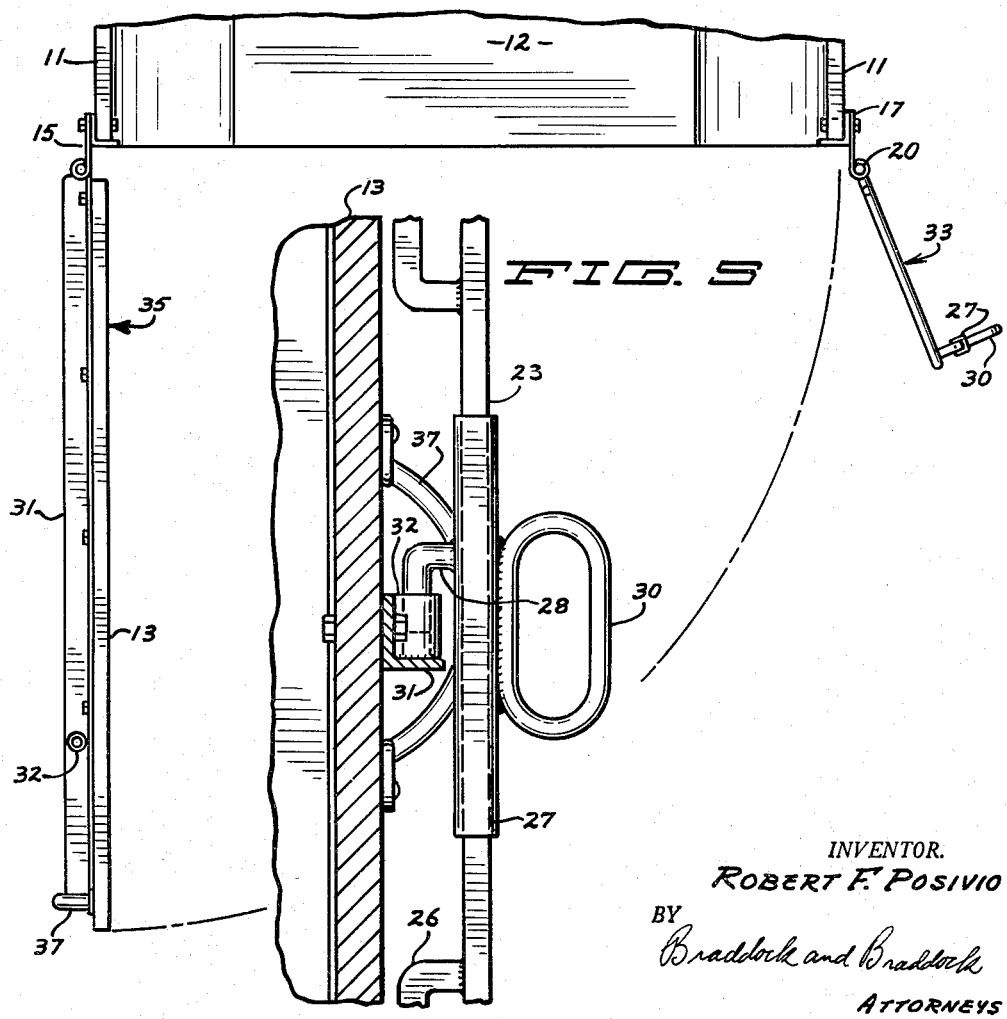

Aug. 8, 1961 R. F. POSIVIO 2,995,400
LATCH FOR A VEHICLE UNLOADING DOOR
Filed Aug. 22, 1960 3 Sheets-Sheet 3

INVENTOR.
ROBERT F. POSIVIO
BY Braddock and Braddock
ATTORNEYS

United States Patent Office 2,995,400
Patented Aug. 8, 1961

2,995,400
LATCH FOR A VEHICLE UNLOADING DOOR
Robert F. Posivio, Sherburn, Minn.
Filed Aug. 22, 1960, Ser. No. 51,152
4 Claims. (Cl. 296—50)

The invention herein has relation to latches for doors and more particularly to a latch for a door that may be opened or closed with a load against it.

To speed the rate of unloading a wagon box farmers favor a rear unloading door that covers the entire end of the box and may be swung completely open. When a wagon box is filled with ensilage, grain, or other material, this large rear unloading door is under high lateral pressure. Ordinary unloading door latches freeze and become inoperative when subjected to these high pressures. The present invention discloses a simply constructed door latch that may be easily operated when the door is under high lateral loads.

It is an object of the present invention to disclose a simple, rugged, low-cost door latch that continues to be operative when the door is subjected to high loads.

In the drawings,

FIG. 1 is a rear elevational view of a wagon box with a rear unloading door latch made according to the present invention;

FIG. 2 is a top plan view of the rear unloading door and latch shown in FIG. 1;

FIG. 3 is a top plan view of the device of FIG. 2 with the unloading door in a first partially opened position.

FIG. 4 is a top plan view of the device of FIG. 2 with the unloading door open;

FIG. 5 is an enlarged fragmentary sectional view taken as on line 5—5 in FIG. 1;

Figure 6:
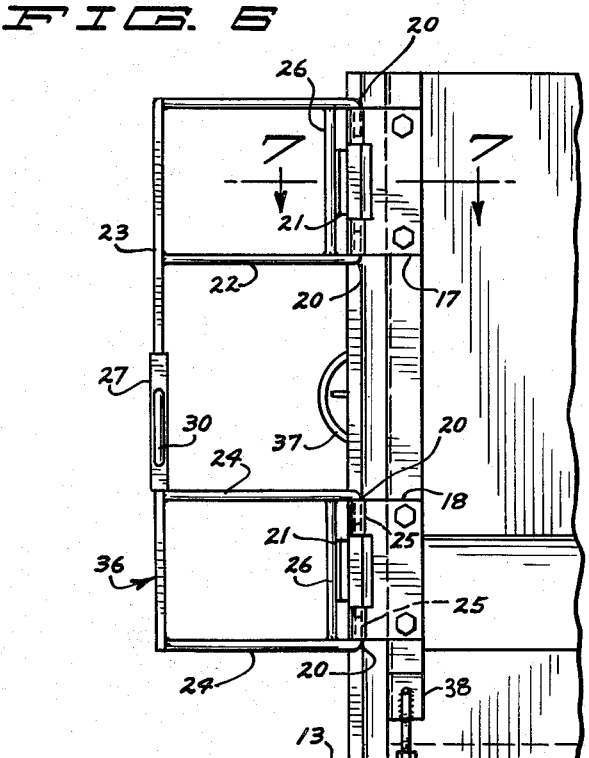
FIG. 6 is a side elevational view of the device of FIG. 3 as viewed from a right side thereof.

Referring to the drawings and the numerals of reference thereon, a wagon box 10 has two sides 11, 11, a floor 12, and a rear unloading door 13. Said box 10 may be mounted on a trailer 14. Unloading door 13 is pivotally fastened to one of sides 11, 11 with an upper door hinge 15 and is attached to a brace 39 with a lower door hinge 19. Brace 39 is fixedly attached to a support 29 of floor 12 and serves to support and reinforce the door and wagon box side 11. The door 13 is openably retained with a latch assembly 16 adjacent a second of sides 11, 11.

Latch assembly 16 includes an upper latch pivot member 17 fastened to second side 11 and extending rearwardly therefrom and a lower latch pivot member 18 attached to a brace 38 and alining vertically with the upper latch pivot member. Brace 38 is attached to floor support 29 in a manner similar to brace 39. Each of the pivot members has two pivot loops 20, 20 vertically spaced from each other to allow a latch tongue 21 which is fixedly attached to door 13 to slidably fit between them.

A lever assembly 22 consists of a vertical rod 23 with two pairs of fixedly attached pivot rods 24, 24 extending horizontally therefrom. Each of said pivot rods has a bent portion 25 that pivotally engages one of loops 20, 20 in the latch pivot members. A tongue contacting bar 26 fixedly connects each pair of pivot rods and is relatively closely spaced from loops 20, 20 to keep the bent portions 25 from coming out of the loops and also to increase the mechanical advantage of the lever assembly.

Figure 7:
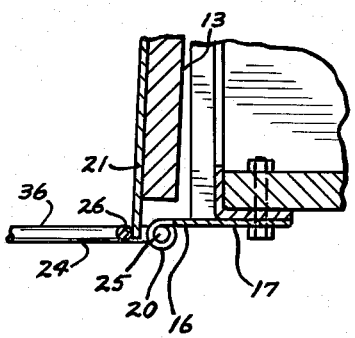
FIG. 7 is a sectional view taken as on line 7—7 in FIG. 6.
Figure 8:
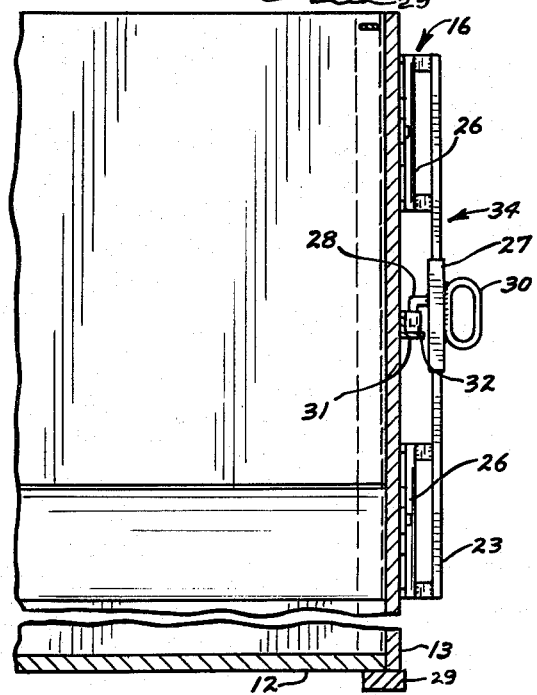
FIG. 8 is a sectional view taken as on line 8—8 in FIG. 1.

Lever assembly 22 may be pivoted from a first closed position such as 34 to a second open position such as 33. In open position 33 the unloading door is free to swing open as at 35. In the closed position each of the bars 26 bears on one of the tongues 21 and securely holds the door closed. With the lever assembly in a partially open position as at 36 (best seen in FIG. 7) the bars 26 each engage a tongue 21 and hold the unloading door partially open. The lateral load on the door due to the material in the box will then be reduced sufficiently to permit safe release of the latch.

A square tube section 27 is slidably mounted over vertical rod 23 and has an inwardly extending L-shaped pin 28 fixedly attached to it. A handle 30 is fixedly attached to the square tube section and extends outwardly therefrom. A door cross brace 31 is attached to door 13 and has an upwardly open tubular retainer 32 fixedly attached to it in position to slidably receive L-shaped pin 28 when the door is closed as at 34. The weight of handle 30 and the square tube section 27 keep the pin 28 from coming out of the retainer 32 when the door is closed as does the lateral pressure from the load on the latch. It is obvious that a spring could be provided to hold the pin in the retainer but practice has shown it to be unnecessary. An auxiliary handle 37 is provided for assisting in moving the door between the opened and closed positions.

When the door is to be opened the tube section 27 may be slid upwardly and the pin 28 disengaged from the retainer. The lever assembly may then be swung rearwardly and outwardly. The bars 26, 26 bearing on tongues 21, 21 move out slowly and allow the door to open slightly. The mechanical advantage of the lever assembly is relatively large and the amount of opening can be easily controlled. When the lever assembly is in the partially open position 36 the door is still firmly held by bars 26, 26. When the lever assembly is rotated to position 33 the door may swing open as shown in FIG. 4.

The rear unloading door 13 may also be closed tightly against a load within the wagon box. The door may be manually moved to a partially closed position so the tongues 21, 21 engage bars 26, 26 with the lever assembly 22 in the partially open position 36. The lever assembly may then be moved to closed position 34 relatively easily due to the large mechanical advantage provided by the latch assembly 16. The L-shaped pin 28 may then be slid into retainer 32 and the door will be held securely closed.

What is claimed is:

1. A latch for an unloading door hingedly connected to a first side of a wagon box opening, extending to a second side thereof and movable from a first open to a second closed position, said latch including a hinge member fastened to said second side and extending outwardly therefrom, said hinge member having two alining spaced hinge loops, two elongated lever members spaced from each other and each having a substantially perpendicular bent portion at a first end thereof, said bent portions facing toward each other and each pivotally engaging one of said hinge loops, said bent portions being of configuration so they do not protrude toward each other beyond their respective hinge loops, a bearing bar fixedly connecting said elongated lever members adjacent said bent portion and preventing separation of said lever members, a handle member fixedly connecting said elongated lever members adjacent second ends thereof, a tongue fixedly attached to said door and being of configuration to snugly fit between the hinge loops of said hinge member, said bearing bar being in contacting overlying relationship with said tongue when said lever members are in a first position adjacent said door in its closed position, and releasable means for holding said lever members in said first position.

2. The combination as specified in claim 1 wherein said bearing bar remains in an overlying relationship with said tongue when said lever assembly is rotated away from said door until said lever extends substantially at right angles to said door and moves into a clearing relationship with respect to said tongue when said lever is rotated to an obtuse angle with respect to said door.

3. A latch for a rear unloading door hingedly connected to a first side of a wagon box, extending to a second side thereof and movable from a first open to a second closed position, said latch including an upper latch unit having a hinge member fastened to an upper portion of said second side and extending rearwardly therefrom, said hinge member having two aligning, spaced hinge loops, two elongated lever members spaced from each other and each having a substantially perpendicular bent portion pivotally engaging one of said hinge loops, a bearing bar fixedly connecting said elongated lever members adjacent said bent portion; a lower latch unit substantially similar to said upper latch unit spaced from said upper latch unit and mounted to said second side; a handle member fixedly joining said upper and said lower latch units adjacent the outer end portion of said elongated lever members; an upper tongue fixedly attached to said door and being of configuration to fit between said upper elongated lever members; a lower tongue fixedly attached to said door and being of configuration to fit between said lower elongated lever members; said bearing bars each being in contacting overlying relationship with one of said tongues when said handle and attached lever members are moved to a first position adjacent said door in its closed position and each remaining in over-lying relationship with said tongue as said handle and attached lever members are moved to a position substantially perpendicular to said door, and said bearing bars moving into a clearing relationship with respect to said tongues when said handle and attached lever members are rotated to an obtuse angle with respect to said door; and means for securing said handle in said first position.

4. The combination as specified in claim 3, a brace attached to said door and extending substantially from said first side of said wagon box to said second side; and wherein said means for securing said handle in said first position includes a member slidably mounted on said handle connecting said latch units, said member having a pin fixedly attached thereto, and a receptacle fixedly attached to said brace open to receive said pin attached to said slidable member.

References Cited in the file of this patent
UNITED STATES PATENTS

| | | |
|---|---|---|
| 1,538,581 | O'Connor | May 19, 1925 |
| 2,429,805 | Conner | Oct. 28, 1947 |